Figure 1:
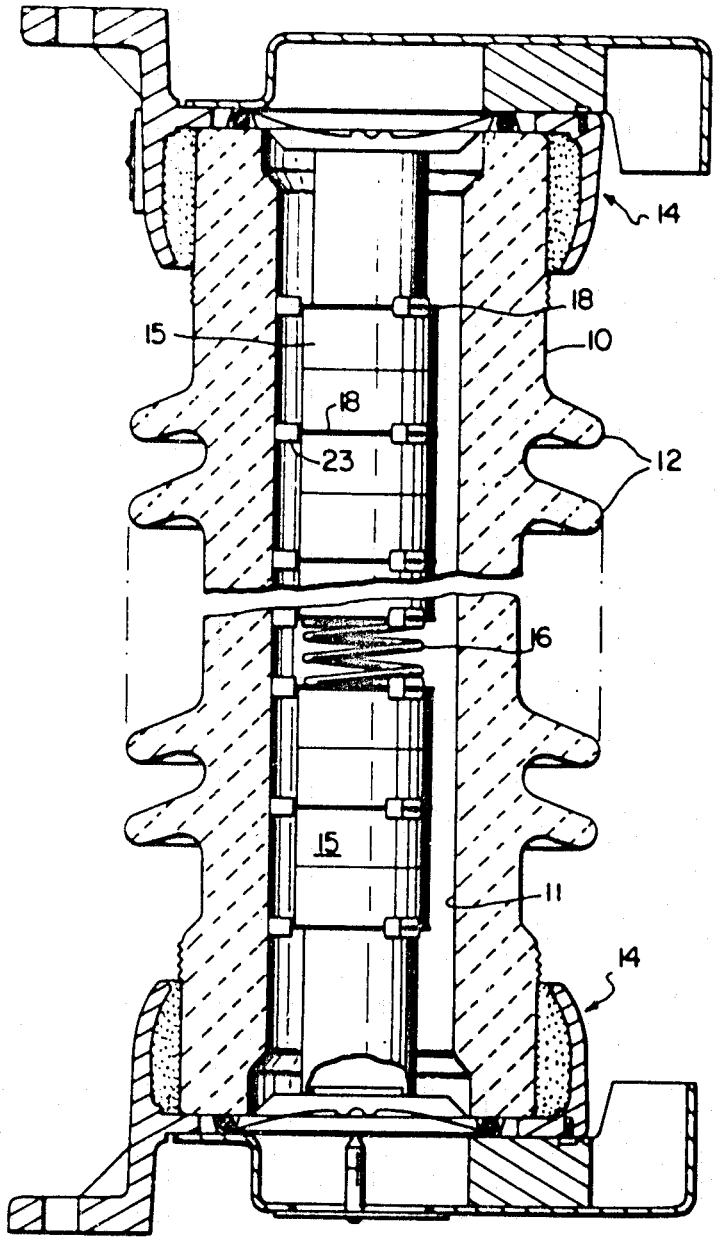
Figure 5:
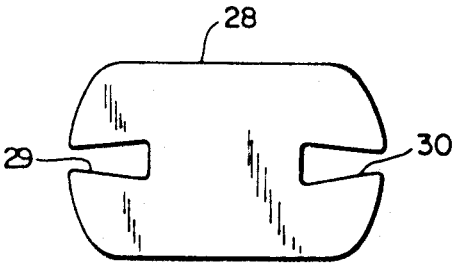
Figure 6:
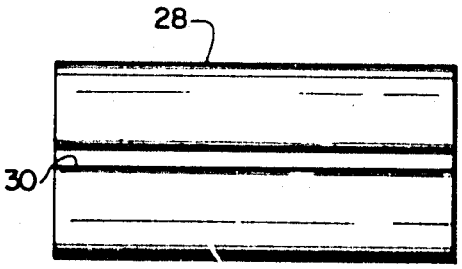

United States Defensive Publication [19] [11] T102,103

Lenk [43] Aug. 3, 1982

[54] SURGE ARRESTER INSULATING SPACER DEVICE

[76] Inventor: Dennis W. Lenk, 430 Miller Dr., Medina, Ohio 44256

[21] Appl. No.: 305,832

[22] Filed: Sep. 25, 1981

[51] Int. Cl.[3] ..... H02H 1/04

[52] U.S. Cl. ..... 361/118; 361/127; 338/21

[57] ABSTRACT

An assembly for mechanically protecting and electrically insulating metal oxide varistor disks from the generally cylindrical inner wall of a porcelain housing of a surge arrestor. Each assembly comprising a flat metal disk having a diameter less than that of the inner wall of the housing and a plurality of resilient, electrically non-conductive spacer members mounted around the periphery of the disk for supporting the disk vertically in the housing.

8 Claims, 2 Sheets Drawing,

14 Pages Specification

The file of this unexamined application may be inspected and copies thereof may be purchased (849 O.G. 1221, Apr. 9, 1968).

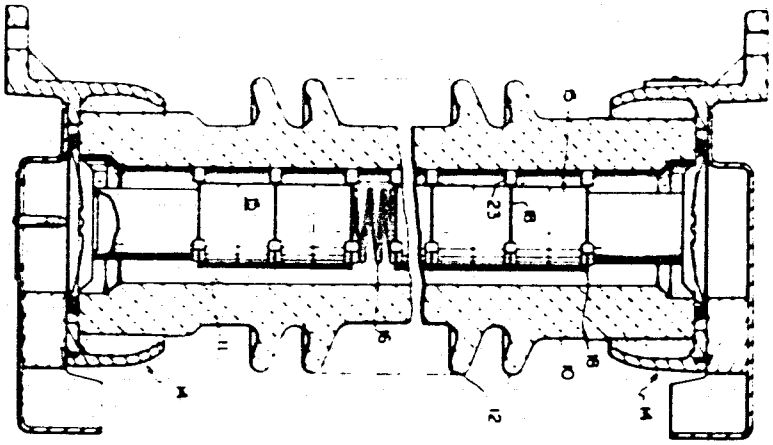

FIG.2
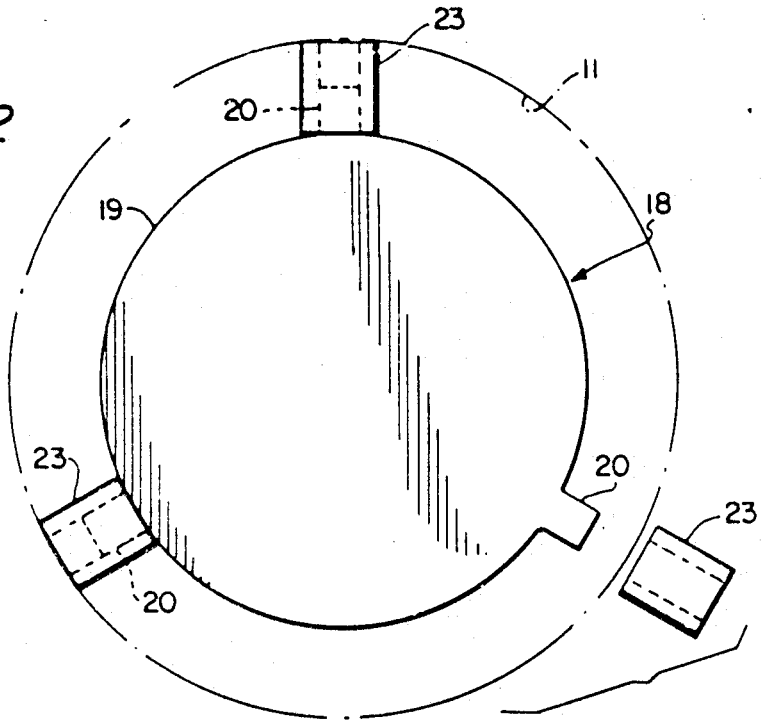
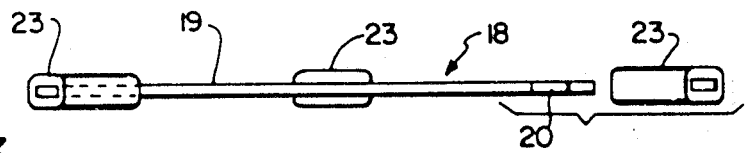
FIG.3
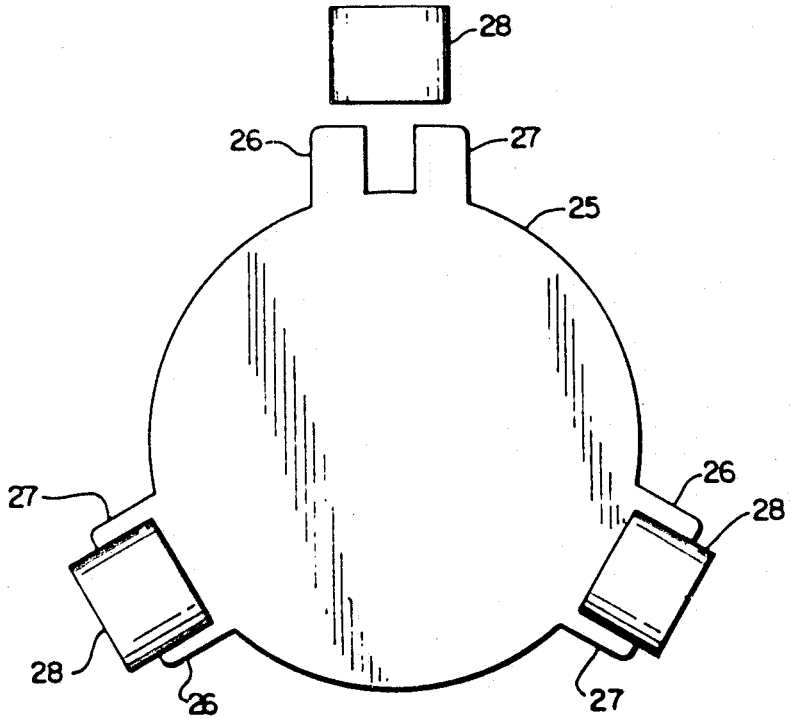
FIG.4